(12) United States Patent
Rajput

(10) Patent No.: US 7,940,409 B2
(45) Date of Patent: May 10, 2011

(54) DATA EXCHANGE IN AN EXCHANGE INFRASTRUCTURE

(75) Inventor: Manjit Singh Rajput, Jalna (IN)

(73) Assignee: SAP AG, Walldorf (DE)

( * ) Notice: Subject to any disclaimer, the term of this patent is extended or adjusted under 35 U.S.C. 154(b) by 1351 days.

(21) Appl. No.: 11/431,185

(22) Filed: May 9, 2006

(65) Prior Publication Data
US 2008/0062467 A1   Mar. 13, 2008

(51) Int. Cl.
*G06F 3/12* (2006.01)
*G06K 15/00* (2006.01)
(52) U.S. Cl. ...................... 358/1.15; 358/1.18
(58) Field of Classification Search ............... 358/1.1, 358/1.15, 1.18; 715/200, 217, 221, 222, 715/223, 224, 225, 226, 239, 273, 274; 709/201, 709/213, 217, 238; 705/40, 39, 309; 707/607, 707/608, 609, 705
See application file for complete search history.

(56) References Cited

U.S. PATENT DOCUMENTS

| | | | |
|---|---|---|---|
| 7,249,113 B1 * | 7/2007 | Continelli et al. | 705/80 |
| 2004/0006539 A1 * | 1/2004 | Royer et al. | 705/40 |
| 2007/0011606 A1 * | 1/2007 | Bagheri | 715/517 |
| 2007/0156977 A1 * | 7/2007 | Ritter et al. | 711/156 |
| 2010/0179913 A1 * | 7/2010 | Royer et al. | 705/309 |

* cited by examiner

*Primary Examiner* — Dov Popovici
(74) *Attorney, Agent, or Firm* — Kenyon & Kenyon LLP

(57) ABSTRACT

An exchange infrastructure (XI) system provides for the receipt, storage and transmission of limited data to uniform user interfaces to provide an improved exchange of data thereacross. In operation with corresponding processing systems, there is a reduced amount of data received by the XI system as well as a reduced amount of data transmitted from the XI system to a recipient processing system. Furthermore, inclusion of operations for utilizing an associated database for storing data and extracting documents therefrom allows the XI system to operate with the reduction of data being transmitted to and received from the external processing systems. In this technique, the XI system is improved by reducing data transmission requirements, reducing amounts of data processing and conversion overhead and eliminating excess data storage outside of the XI system itself.

17 Claims, 4 Drawing Sheets

DATA EXCHANGE IN AN EXCHANGE INFRASTRUCTURE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to exchanging data between different processing systems and more specifically to exchanging data associated with and embeddable within electronic documents across an exchange information (XI) processing system.

In current processing systems using an XI system, the XI system provides a central repository of information as well as for the translation and exchange of information across different and typically incompatible software platforms. The XI system centrally stores information usable by various parties accessing the system. The XI system also allows the exchanging of information between these platforms that were previously unable to exchange data based on a formatting and translation concerns. The XI system use an intermediate translation technique to convert documents and data resident therein between different formats.

In one approach, incoming documents are translated from a first encoding into an extensible mark-up language (XML) encoding. The XML encoding uses standardized or open formatting, which allows most platform-specific encodings to be readily translated and usable by different platforms. In the existing systems, a copy of the translated document and the data contained therein is saved on the processing systems that access the XI system.

To share the document, the XI system translates a document and data to be associated therein from an intermediate language to a second language readable by the second processing device. The data may also be stored in the XI system, as it acts as a central repository, therefore the data is written to a storage location associated with the XI system. The translated document and data may then be transmitted to the second processing system by the XI system.

In a typical application, the document and subsequent data is exchanged to pass information back and forth between these systems. A common example may be a purchase order application that submits a purchase order document from the first system to the second system. The purchase order document includes data fields having information supplied by a user using the first system. The document may also contain blank fields for a user using the second system to supply further information. For example, the first user may enter information relating to ordering different products from the second user, but the first user may not know specific information, such as specific cataloging or referencing information or delivery terms. Therefore, the first user enters as much information as possible in the first user's system. The partially completed document is then sent to the XI system, where the information is translated and stored. The partially completed document is also sent to the second user where the second user can enter the missing information to complete and acknowledge the purchase order.

Once input information is supplied by the user using the second system, the document is locally saved on the second system. The document and the associated data is then transmitted to the XI system where it is again translated, this time from the second encoded language to the language readable by the XI system. The XI system saves the new document in its storage location. And finally, the document is translated back into a language usable by the first system and the document and the associated data is the transmitted back to the first system.

This process requires significant translation of the document between these different systems. This process also requires duplicative storage of these documents in many locations. In the above example, the document and associated data is stored on the first system, the second system and the XI system. Using the XI system further requires extensive data transmission between different systems with the various translated documents.

Furthermore, the full data set is converted each time, including any information that may not be utilized in subsequent steps. The existing approach is extremely inefficient because the full translation includes data elements that are not required. Furthermore, this system create superfluous data files as the data is maintained in many different locations.

DETAILED DESCRIPTION

An improved exchange infrastructure (XI) system provides for the receipt, storage and transmission of limited data to uniform user interfaces to provide an improved exchange of data thereacross. In operation with corresponding processing systems, there is a reduced amount of data received by the XI system as well as a reduced amount of data transmitted from the XI system to a recipient processing system. Furthermore, inclusion of operations for utilizing an associated database for storing data and extracting documents therefrom allows the XI system to operate with the reduction of data being transmitted to and received from the external processing systems. In this technique, the XI system is improved by reducing data transmission requirements, reducing amounts of data processing and conversion overhead and eliminating excess data storage outside of the XI system itself.

Figure 1:
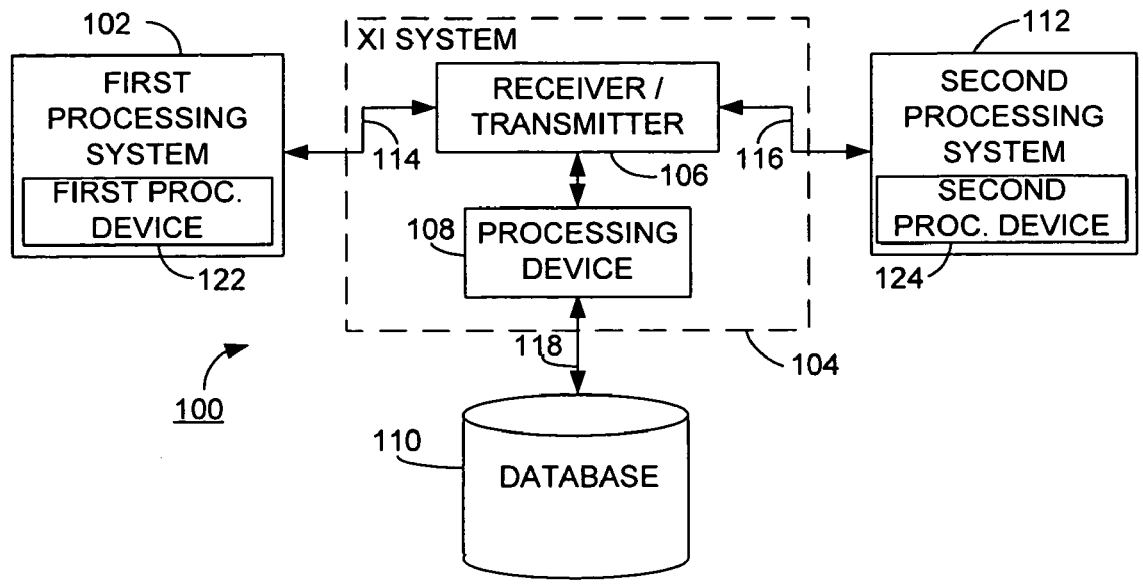
FIG. 1 illustrates a block diagram of one embodiment of a system providing the data exchange across an exchange infrastructure system.

FIG. 1 illustrates a block diagram of one embodiment of a system 100 including a first processing system 102, an XI system 104 including a receiver/transmitter 106 and a processing device 108, a database 110 and a second processing system 112. The first processing system 102 and second processing system 112 may be one more processing devices and other elements providing for user interaction with the XI system. For example, the first processing system 102 may be a computer terminal or system including input and output devices for interaction with one or more users. The first processing system 102 includes a communication path 114 to the XI system 104 and the second processing system 112 also includes a communication path 116 to the XI system 104. The communication paths 114 and 116 may be networked communication paths allowing for communication across one or more networked connections, such as across an intranet or Internet-based connection using standard or otherwise recognized communication and security protocols.

As recognized by one skilled in the art, the XI system 104 may include other features providing for the operation of the XI system 104, which have been omitted for clarity purposes only. The receiver/transmitter 106 may be one or more devices providing for the receipt and transmission of data between the first and second processing systems 102, 112 across the paths 114 and 116. The receiver/transmitter 106 may use standard protocols for facilitating communication outside of the XI system 106.

The processing device 108 may include one or more processing devices performing various operations in response to executable instructions encoded and/or stored therein. The processing device 108 provides for performing data manipulation of various data exchanged between the processing systems 102 and 112. Moreover, the processing device 108 allows for the communication with the database 110 across a connection 118, where the database 110 may be incorporated within the XI system or as illustrated in FIG. 1, external and in direct connection thereto.

Also illustrated in FIG. 1, the first processing system 102 includes a first processing device 122 and the second processing system 112 includes a second processing device 124. These processing devices 122 and 124, similar to the XI system processing device 108 are operative to perform various functions in response to executable instructions. It is further noted that the processing systems 102, 112 and the processing devices 122, 124 operate in a native or resident operating system where the operating systems may not necessarily be compatible with each other or the operating system of the XI system 104.

Figure 2:
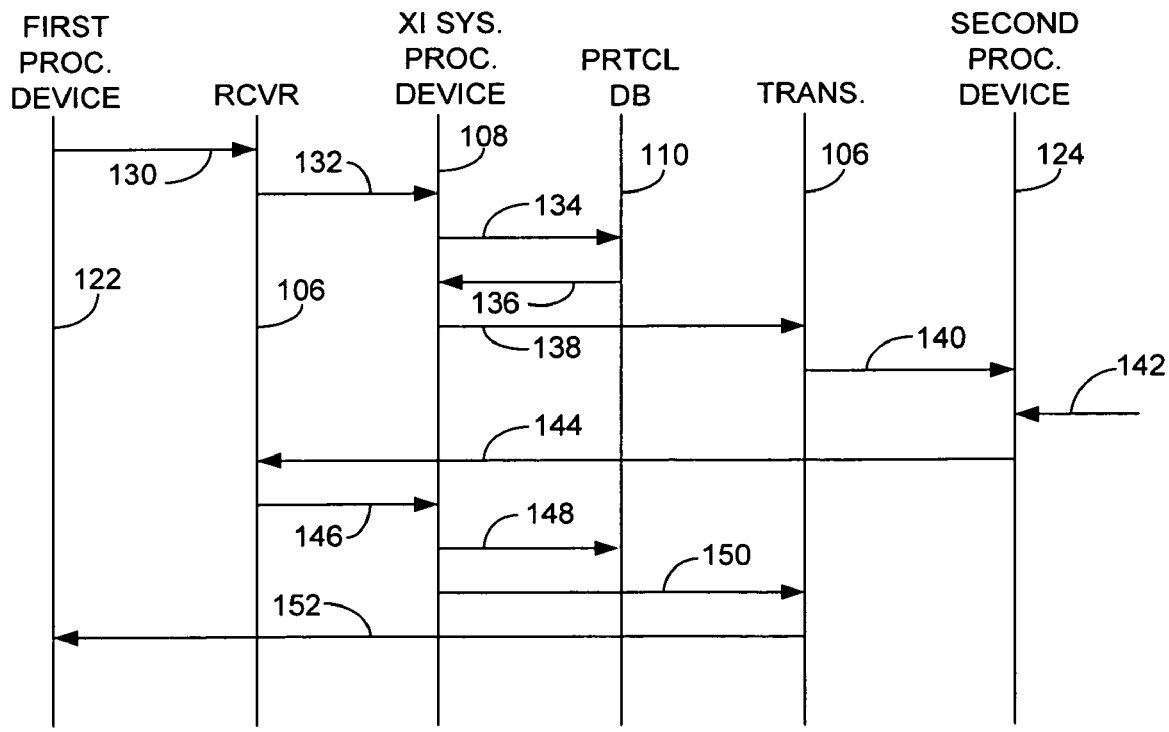
FIG. 2 illustrates a data flow diagram of the exchange of data in the system of FIG. 1.

Relative to the system 100 of FIG. 1, FIG. 2 illustrates a data flow diagram of one embodiment in the exchange of data across the XI system 104. The data flow diagram illustrates data flow among the first processing device 122, disposed in the first processing system 102, the receiver 106, XI system processing device 108 and the transmitter 106 disposed in the XI system 104, the database 110 and the second processing device 124, disposed in the second processing system 112. It is recognized that the receiver/transmitter 106 is illustrated as a single element in FIG. 1, but it is differentiated for clarity purposes in the data flow diagram of FIG. 2, providing for the data flow across the receiver element apart from the transmitter element of the receiver/transmitter 106.

In the data flow diagram of FIG. 2, the first processing device 122 provides a data transmission 130 including data fields and input fields relating to an electronic document or form document from the first processing system 102. The data transmission 130 may further include additional routing information for transmission from the first processing system 102 to the XI system 104. For example, in one embodiment a user may access a form document, such as purchase order form, and enter information in data fields. The entered information is included in the data fields data structure. Fields in the form that do not have information entered therein may be designated as input fields, the data structure of the input fields indicating the information that is requested as well as indicating that the field still needs information entered therein.

In the data flow diagram of FIG. 2, the receiver 106 receives the data 130. As described in further detail below, the data transmission includes the data fields and input fields encoded in an open encoding language, such as XML, so the receiver 106 does not have to translate the data 130. Instead, upon receipt, the receiver 106 extracts the data, providing the data fields and input fields 132 to the XI system processing device 108.

Based on these data fields and input fields 132, the processing device 108 determines a corresponding form document, which may be an electronic form, that was used by the first processing device 122. This may be done using an identifier in the data fields and/or input fields 132. Based on this determination, a document request 134 is provided to the database 110. Using document retrieval techniques, the appropriate form document 136 is extracted from the database 110 and provided to the XI system processing device 108.

With this document, the XI processing device 108 may provide the form document, data fields and input fields 138 to the transmitter 106 within the XI system 104. The transmitter 106 includes the form document, data fields and inputs in a data communication 140 and transmits the communication 140 to the second processing device 124 in the second processing system 112.

In the second processing system 112, the second processing device 124, as described in further detail below, utilizes a user interface to provide a visual output and allow for user input. In one embodiment, the form document from the database 110 is displayed with the data fields and input fields viewable. A user using the second processing system 112 then sees a recreation of the input provided through the first processing system 102. In the data flow diagram of FIG. 2, the second processing device 124 receives user input 142, which includes data entered into the input fields in the document.

The second processing device 124, once the user has entered the user input 142, provides a communication 144 that includes only the input data relative the information previously transmitted to the second processing system in the communication 138. The communication 144 to the receiver 106 does not include the form document, the data fields or the input fields. The communication 144 may include additional information usable for routing to the XI system 104, such as header information for example.

In one embodiment, not specifically illustrated in the data flow diagram of FIG. 2, once the input data is transmitted in the communication 144, extraneous data may be readily deleted from the second processing system 112. For example, the second processing system 112 may delete the form document, the data fields and the input fields. The second processing system 112 may even further delete the input data if desired.

Within the XI system 104, the receiver 106 thereupon provides the input data 146 to the XI system processing device 108. The processing device 108 may associate the input data with the corresponding document and/or input fields. Once the appropriate corresponding match is determined, the input data is provided in a write command 148 to the database. In one embodiment, the input data 142 may include an identifier indicating the document and input fields the data is associated with, so the processing device can recreate the document with completed information based on the data fields received from the first processing device 102 and the input data received from the second processing device 112. Similarly, an embodiment may include setting a flag in the XI system 104 when the first processing device sends data 130. Thereupon, when the corresponding communication 144 is received, the flag may be set to complete. In the XI processing device 108, once the complete flag has been set, the input data may then be transmitted to the first processing system 102.

The processing device 108 in the XI system 104 may provide a communication 150 to the transmitter 106, where the communication includes the input data and an identifier of the first processing system 102, such as routing information. Based on the identification information, the transmitter 106 thereupon send a transmission 152 to the first processing device 122, for example in one embodiment the transmission 152 includes the input data and other information identifying the corresponding form to which the input data corresponds. Based on the identification information, the first processing device 122 may thereupon receive the transmission 152 and re-assemble the form document based on the data fields and the newly received input data.

Thereupon, through the data flow as illustrated in FIG. 2, there is a reduction in the amount of data transmissions, as well as a reduction in the amount of overhead required to process and store the data. These reductions provide for improved efficiency in the execution of exchanging data through the XI system 104. The data flow of FIG. 2 also illustrates that the data is additionally stored in the database 110 as a central repository while allowing for the data exchange.

One aspect of the XI system 104 of FIG. 1 is the ability to exchange data between different systems when the systems operate on non-inter-operative operating systems. As noted above, the first processing system 102 and the second processing system 112 may be different software operating systems. Therefore, the XI system 104 provides a platform independent means for communicating between these systems.

Figure 3:
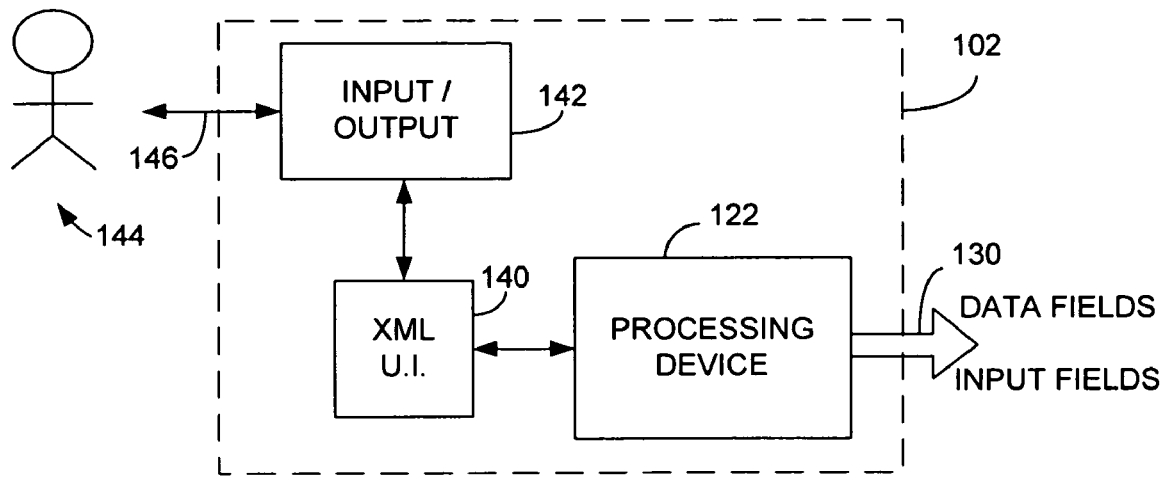
FIG. 3 illustrates a block diagram of one embodiment of the first processing system of FIG. 1.

FIG. 3 illustrates a graphical representation of one embodiment of the first processing system 102 including the processing device 122, a user interface 140 and an input/output device 142. The first processing system 102 is usable by a first user 144.

In the illustrated embodiment, the user interface 140 is an XML user interface, but it is understood that the user interface 140 may be in any suitable language usable by the first processing system 102. The input/output device 142 may be any suitable device allowing for interaction through the user interface 140.

In one embodiment, the user 144 may, through the input/output device 142, load a form document through the first processing device 122. In one embodiment, the first processing device 122 may contain a copy of the form document in a resident storage location (not illustrated) or in another embodiment, the first processing device 122 may retrieve a form document from the XI system (104 of FIG. 1). Regardless of how the form document is originally presented to the user 144, the input device 142 receives input information from the user 144.

Figure 4:
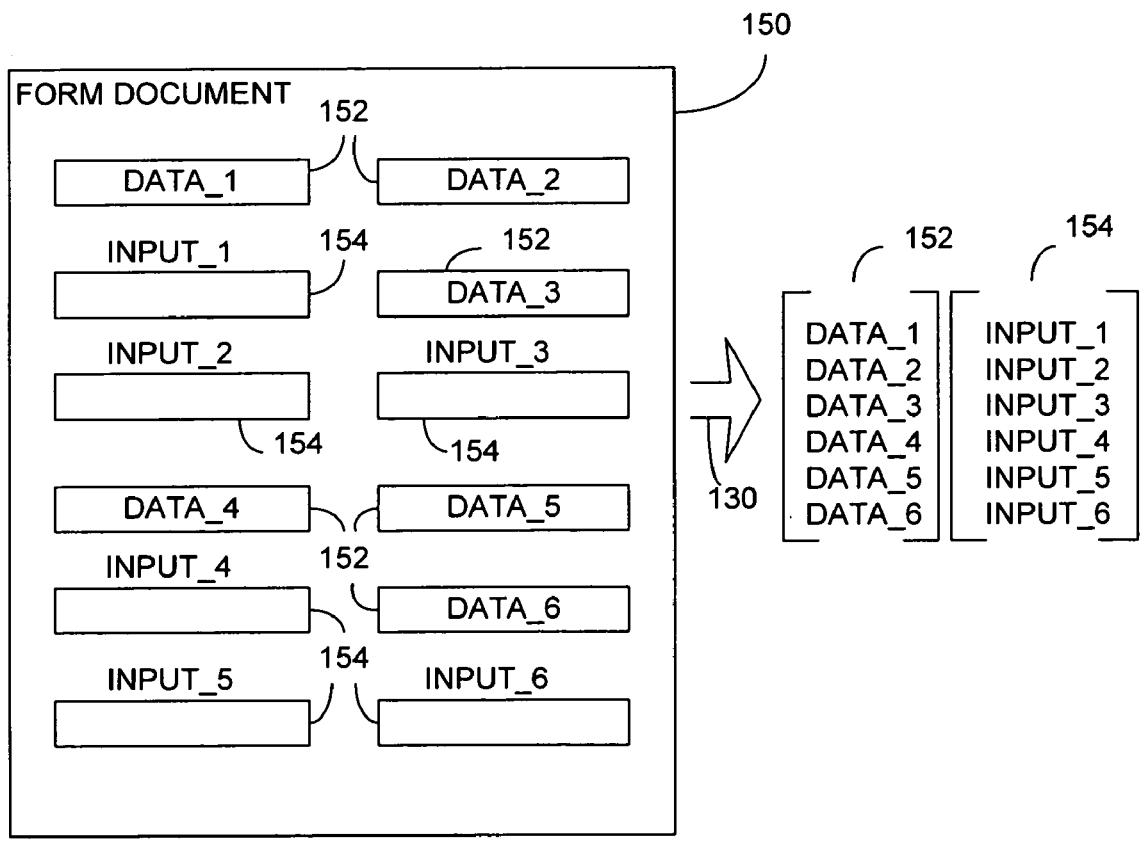
FIG. 4 illustrates a graphical representation of the data transmitted by the processing device of FIG. 3.

FIG. 4 illustrates a graphical representation of an output display of a form document 150 including a plurality of data fields 152 and input fields 154. Through the user interface 140, the form 150 is made available for display on the output device 142 in the first processing system 102. When the user 144 enters the input information, this information is processed and inserted in data fields 152.

Referring back to FIG. 3, through the user interface 140, the processing device 122 includes three data elements that make-up of the display illustrated in FIG. 4. The data elements include the form 150, the data fields 152 and the input fields 154. The form 150 is the combination of encoding and instructions used to generate the graphical display of information. The data fields 152 include a data structure indicating the type of the data field as well as the information stored therein. For example, if the data field is an address field, the field includes the indication that the field is an address field as well as the address information associated therewith. The input fields 154 include a data structure indicating the type of data field and the information sought to be inserted therein. It is also recognized, there may be further additional data fields and structures, such as metadata and proprietary or security information that is beyond the scope of this disclosure.

Through the first processing device 122, the information is processed and a transmission 130 is provided to the XI system (104 of FIG. 1). As further graphically illustrated in FIG. 4, the transmission 130 includes two data sets, the first data set is the data fields 152 and the second set is the input fields 154. In one embodiment, the form 150 is not transmitted to the XI system. Thereby, the XI system (104 of FIG. 1) receives and processes less information.

Figure 5:
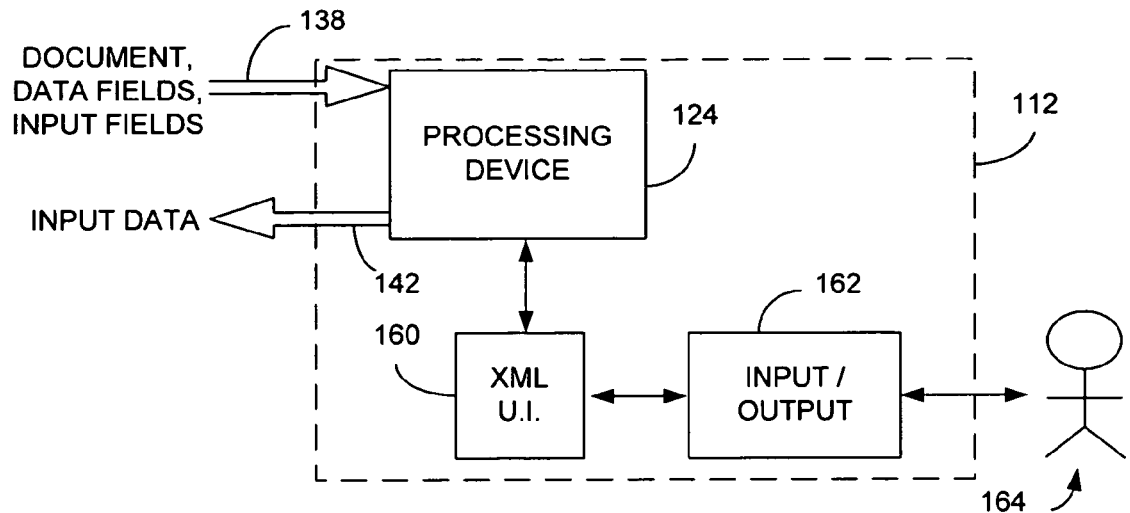
FIG. 5 illustrates a block diagram of one embodiment of the second processing system of FIG. 1.

As described above with respect to FIGS. 1 and 2, the XI system 104 thereupon performs various operations to generate the output signal 140. FIG. 5 illustrates a block diagram of one embodiment of the second processing system 112 including the second processing device 124, a user interface 160 and an input/output device 162, providing interaction with a second user 164. The user interface 160 and input/output device 162 may be similar to the user interface 140 and input/output device 142 in the first processing device 102 of FIG. 3.

Figure 6:
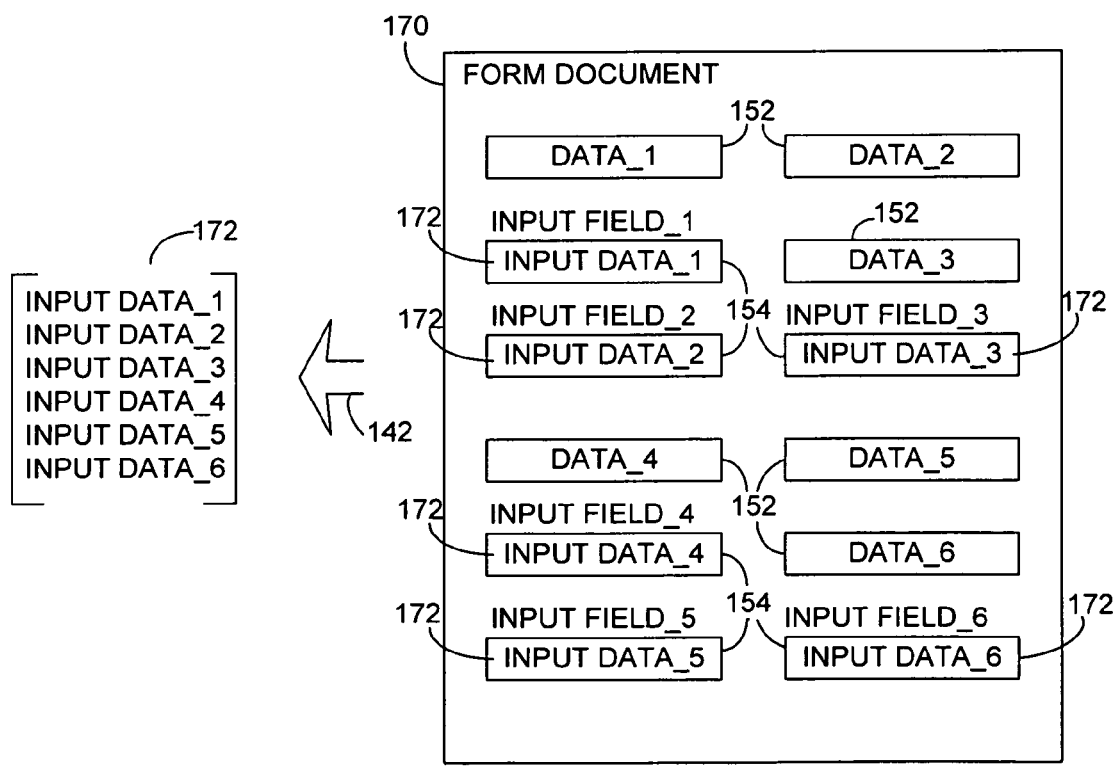
FIG. 6 illustrates a graphical representation of the data transmitted by the processing device of FIG. 5.

As described above in FIGS. 1 and 2, the second processing device 124 receives the incoming data transmission 140 including a document from the database (110 of FIG. 1), data fields 152 and input fields 154. Through the processing device 124 and the user interface 160, a visual display may be generated on the output device 162 recreating the form 150 from the first processing system 102. FIG. 6 illustrates a graphical representation of a display of the form document 170, data fields 152 and input fields 154.

Through the input/output device 162 of FIG. 5, the second user 164 may enter input data 172 in the input fields 154. In one embodiment, through the user interface 160, the second user 164 may enter requested information to complete the document 170, using known data entry techniques.

Through the second processing device 124, only a portion of the data in the form 170 is submitted back to the XI processing system (104 of FIG. 1). As the second processing device 124 received the document, data fields and input fields in the transmission 138, this information is already resident on the XI processing system. Therefore, the second processing device 124 provides the transmission 142 of just the input data.

The document 170, data fields 152 and input fields 154 are not transmitted to the XI processing system. Furthermore, in one embodiment, as soon as the input data 172 is transmitted or upon confirmation of receipt by the XI processing system, the remaining data (the document 170, the data fields 152 and input fields 154) may be readily removed or deleted from any storage location(s) relative to the second processing system 112.

Figure 7:
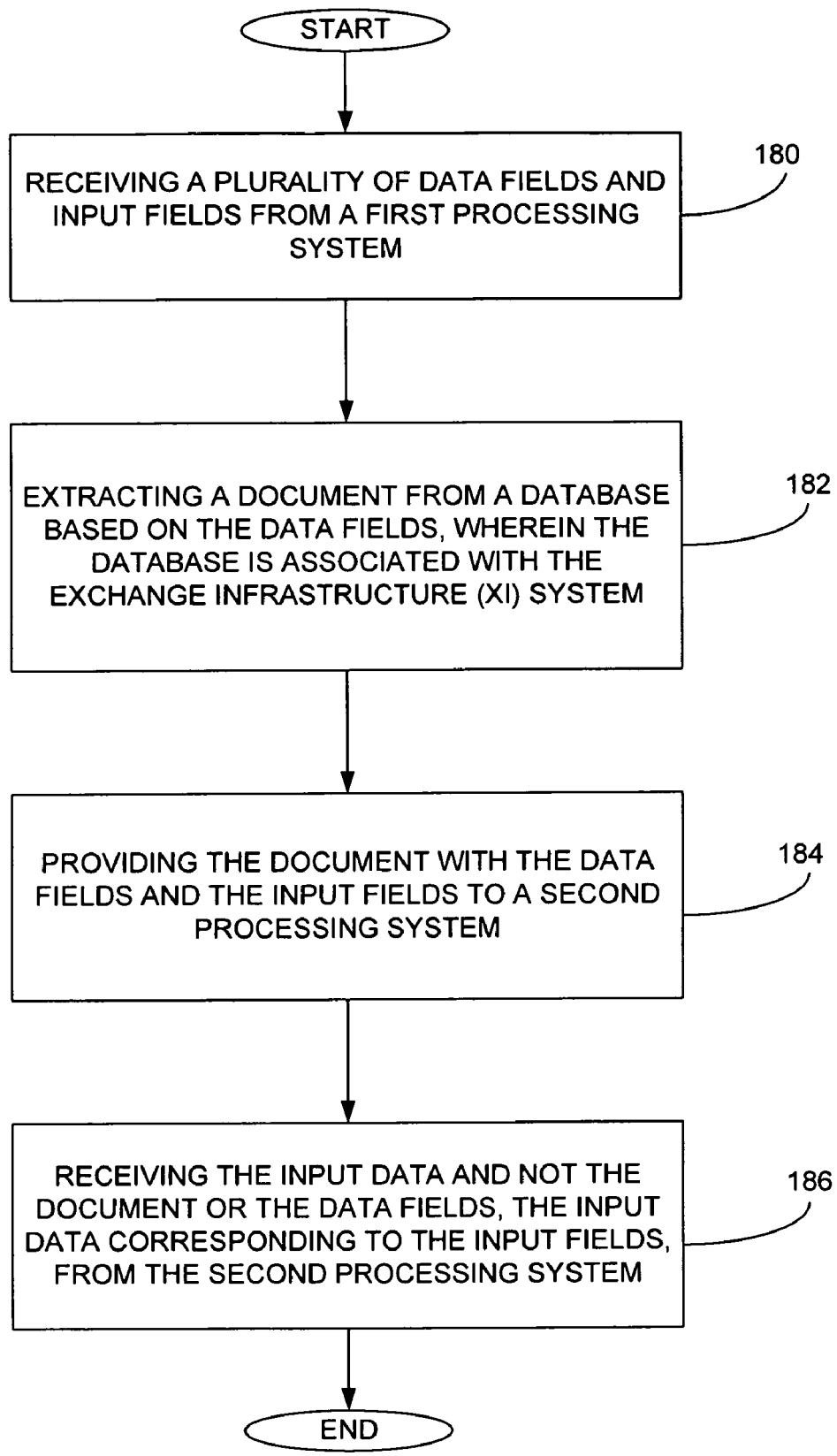
FIG. 7 illustrates a flowchart of the steps of one embodiment of a method for providing the data exchange across an exchange infrastructure system.

FIG. 7 illustrates the steps of one embodiment of a method for exchanging data across an XI system. The first step, step 180, receiving a plurality of data fields and input fields from a first processing system. In one embodiment, these data fields 152 and input fields 154 may be received from the first processing system 102 in response to input from a first user 144. These data fields 154 and input fields may be received by the XI system 106, as described above.

The next step, step 182, is extracting a document from a database based on the data fields, wherein the database is associated with the XI system. This step may be performed by the XI system processing device 108, as described with respect to FIG. 1. In one embodiment, the data fields 152 may include an indication of the document to which the data fields are associated. In another embodiment, the combination of data fields 152 and input fields 154 may be used to determine which document is to be retrieved. The extraction of the document from the database 110 of FIG. 1 may be performed using known document retrieval techniques.

The next step, step 184, is providing the document with the data fields and input fields to a second processing system. This step may be performed by the XI system 104 providing the transmission 140 (of FIG. 2) to the second processing system 112. With the document, data fields and input fields, the second processing system 112 may thereupon recreate the document previously visible in the first processing system 102. Thereupon, the second user 164 may enter input information to the input fields to complete filling out the document.

In one embodiment, once the second user 164 has completed entering information, the final step, step 186, is receiving the input data and not the document or the data fields, where the input data corresponds to the input fields. The XI processing system 104 may receive the input data 172 from the second processing 112. Thereupon, in one embodiment, the method is complete.

The transfer of limited data and the utilization of a database associated with an XI system improves the exchange of data through the XI system. In the first processing device, there may be less data transmitted to the XI system. In the XI system, less data processing is required because less data is received. Similarly, in the second processing system, less data transfer is utilized by the second processing system only transmitting the input data back to the XI system. Through this approach, the transfer of extraneous data is omitted, as well as the superfluous storage of data in extra locations as it is centrally stored in the database 110.

Similarly, further processing requirements are reduced through utilizing standard user interfaces. The data transferred through the XI interface may be maintained in the open formatting because both the first processing system and the second processing system includes appropriate interfaces. Similarly, as the XI system is usable by any number of processing systems, there is a large degree of improved processing by reducing overhead associated with data translation between systems when dealing with any number of different systems.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A method for data exchange across an exchange infrastructure (XI) system comprising:
   receiving by the XI system a plurality of data fields and input fields, without a first form document, from a first processing system, wherein the first form document includes instructions used by the first processing system to generate a graphical display for entry of data into the data fields and input fields on the first processing system;
   automatically selecting by the XI system a second form document from a database based on an identifier in the data fields, wherein the database is associated with the XI system;
   providing the second form document with the data fields and input fields to a second processing system, wherein the second form document contains instructions for use by the second processing system to recreate the graphical display of the first form document; and
   receiving input data, without the second form document and without the data fields, by the XI system from the second processing system, the input data corresponding to user input received by the second processing system for the input fields.

2. The method of claim 1 further comprising:
   deleting the data fields and input data from the second processing system.

3. The method of claim 1 further comprising:
   transmitting the input data to the first processing system.

4. The method of claim 1 further comprising:
   storing the data fields and the input data in the database.

5. The method of claim 4 wherein the data fields, input fields and input data are received formatted in a mark-up language.

6. The method of claim 5 further comprising:
   receiving the input data through a mark-up language user interface such that the input data is in the mark-up language format and transmitted to the first processing system in the mark-up language format.

7. The method of claim 1 wherein the data fields and input fields are received from the first processing system formatted in a mark-up language.

8. The method of claim 1 further comprising:
   upon receipt of the input data from the second processing system, setting a complete flag; and
   transmitting the input data to the first processing system when the complete flag is set.

9. An exchange infrastructure (XI) system providing for data exchange, the system comprising:
   a database having form documents stored therein;
   a receiving device for receiving data fields and input fields, without a first form document, from a first processing system, wherein the first form document includes instructions used by the first processing system to generate a graphical display for entry of data into the data fields and input fields on the first processing system;
   a processing device in communication with the receiving device operative to automatically select a second form document from the database based on an identifier in the data fields from the receiving device;
   a transmitting device for transmitting the second form document with the data fields and input fields to a second processing system, wherein the second form document contains instructions for use by the second processing system to recreate the graphical display of the first form document; and the receiving device receiving input data, without the second form document and without the data fields, from the second processing system, the input data corresponding to user input received in the second processing system for the input fields.

10. The XI system of claim 9 further comprising:
the processing device operative to set a complete flag upon receipt of the input data; and
the transmitting device operative to transmit the input data to the first processing system based on a status of the complete flag.

11. The XI system of claim 9 further comprising:
the processing device operative to store the data fields from the first processing system and the input data from the second processing system in the database.

12. The XI system of claim 9 wherein the data fields, input fields and input data are received by the receiving device in a mark-up language format.

13. A processing system using an exchange infrastructure (XI) system, the processing system comprising:
a first processing device providing a plurality of data fields and input fields, without a first form document, to the XI system, wherein the first form document includes instructions used by the first processing device to generate a graphical display for entry of data into the data fields and input fields on the first processing device;
a database associated with the XI system, the database having form documents stored therein;
a receiving device operative to receive the data fields and input fields;
an XI processing device in the XI system, the XI processing device operative to:
receive data fields and input fields from the first processing device;
automatically select a second form document from the database based on an identifier in at least one of the received data fields and input fields; and
provide the second form document, data fields and input fields to a second processing device, wherein the second form document contains instructions for use by the second processing device to recreate the graphical display of the first form document; and
the second processing device operative to:
receive input data based on the second form document, wherein the input data corresponds to user input received for the input fields;
transmit the input data to the XI system without the second form document and without the data fields; and
delete the second form document, data fields and input fields therefrom.

14. The processing system of claim 13 wherein:
the receiving device is operative to receive the data fields and input fields from the first processing device.

15. The processing system of claim 13 further comprising:
a transmitting device for transmitting the second form document with the data fields and input fields.

16. The processing system of claim 13 wherein the data fields, input fields and input data are received by the XI processing device in a mark-up language format.

17. The processing system of claim 16 wherein the XI processing device is further operative to receive the input data through a mark-up language user interface such that the input data is provided to the second processing device in the mark-up language format.

* * * * *